Jan. 27, 1970 W. E. ARNOLD 3,492,554
COMPARISON AND CONTROL CIRCUIT USING LATCH TYPE
SEMICONDUCTOR SWITCH
Filed Nov. 15, 1966 2 Sheets-Sheet 1

WITNESSES:
Bernard R. Giegue
James F. Young

INVENTOR
Wayne E. Arnold
BY E. F. Possessky
ATTORNEY

Jan. 27, 1970 W. E. ARNOLD 3,492,554

COMPARISON AND CONTROL CIRCUIT USING LATCH TYPE SEMICONDUCTOR SWITCH

Filed Nov. 15, 1966 2 Sheets-Sheet 2

United States Patent Office 3,492,554

Patented Jan. 27, 1970

3,492,554
COMPARISON AND CONTROL CIRCUIT USING LATCH TYPE SEMICONDUCTOR SWITCH

Wayne E. Arnold, Murrysville, Pa., assignor to Westinghouse Electric Corporation, Pittsburgh, Pa., a corporation of Pennsylvania Filed Nov. 15, 1966, Ser. No. 594,626
Int. Cl. H02p 5/22
U.S. Cl. 318—146 9 Claims

ABSTRACT OF THE DISCLOSURE

A pair of SCRs are gate controlled by separate opposed output windings on a magnetic core. An input winding on the core is supplied with a fluctuating signal. Comparison or control windings on the core are supplied with respective signals to be compared. The net ampere turns supplied by the input winding and the comparison windings determine which output winding generates a switch gating voltage.

BACKGROUND OF THE INVENTION

The present invention relates to comparison and control circuitry and more particularly to latch type semiconductive switch circuitry adapted for comparison and control use in logic systems, speed or voltage regulating systems, digital process computer inputting systems and other applications.

There are a variety of circumstances under which the magnitudes of two analog or two digital signals must be compared for logic or control purposes. For example, system feedback control in general requires corrective control action when the system analog set point signal and the analog feedback signal are unequal. An error signal is often generated simply as an algebraic analog summation of the set point and feedback signals, but ON-OFF digital type system control action can be employed in accordance with the result of set point and feedback signal comparison. As another example, digital logic systems often require comparison between two binary signals to determine whether they have like or different states. In all comparison circuit applications, it is often desirable to use latch type semiconductive switches such as silicon controlled rectifiers as the active logic or control switch elements in order to obtain operating advantages including comparison circuit output at an elevated power level and convenient comparison circuit input-output isolation by means of transformer controlled switch gating.

SUMMARY OF THE INVENTION

In accordance with the board principles of the present invention, a comparison or control circuit includes a pair of latch type semiconductive switches respectively connected in parallel capacitor commutated paths with respective resistors connected in series between the switches and a voltage source. A gating control circuit includes a saturable transformer having a pair of gate control windings oppositely wound or connected so as to apply opposed polarity gate circuit voltages to the switches. The transformer also includes at least one but usually two or more signal input windings and at least one pulse input or AC input control cycle winding which are coupled to the gate control windings through the saturable core. Normally, only one of the switches is conductive in each core cycle as determined by the total ampere turns applied to the transformer core by the input windings. In turn, the conductivity states of the switches in each core cycle determine the circuit output for control, logic or indicational purposes in various applications.

It is therefore an object of the invention to provide a novel latch type semiconductive switch comparison circuit which is accurately and efficiently operable in various applications.

Another object of the invention is to provide a novel latch type semiconductive switch comparison logic circuit adapted to compare two digital signals accurately and efficiently.

A further object of the invention is to provide a novel latch type semiconductive switch comparison control circuit adapted to compare analog signal values and produce a digital output signal for control use in process computer inputting or other similar systems thereby reducing the amount of required analog inputting to the computer for limit checks or the like.

An additional object of the invention is to provide a novel latch type semiconductive switch comparison control circuit adapted to compare feedback and set point signals and directly or indirectly provide efficient control of the transmittal of power to the controlled device or system.

It is another object of the invention to provide a novel latch type semiconductive switch comparison control circuit adapted to provide efficient motor speed control.

These and other objects of the invention will become more apparent upon consideration of the following detailed description along with the attached drawings.

DESCRIPTION OF THE PREFERRED EMBODIMENT

Figure 1:
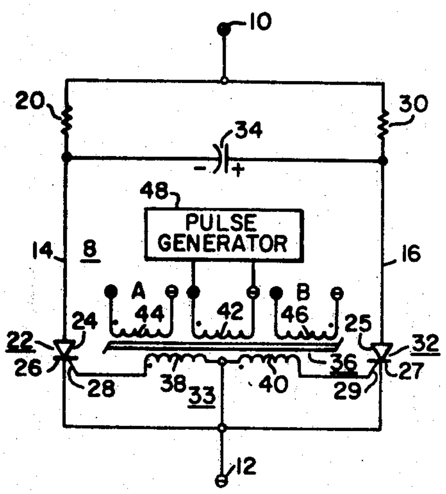
FIGURE 1 shows a schematic diagram of a comparison circuit arranged in accordance with the principles of the invention.

More specifically, there is shown in FIGURE 1 a comparison circuit 8 arranged in accordance with the principles of the invention. In general, the comparison circuit 8 can be modified to serve various end indicational, control or logic purposes as will subsequently be more fully exemplified.

A pair of parallel current paths 14 and 16 are connected between terminals 10 and 12 which in turn are connectable to a DC voltage source. In the current path 14, a current limiting resistor 20 is connected in series with a latch type semiconductive logic or control switch preferably in the form of a silicon controlled rectifier 22 having an anode 24, a cathode 26 and a gate 28. Similarly, the current path 16 includes a current limiting resistor 30 in series with a silicon controlled rectifier logic or control switch 32 having an anode 25, a cathode 27 and a gate 29. A commutating capacitor 34 is connected between the respective junctions of the resistors and the silicon controlled rectifiers. By "latch type switch," it is meant to refer to a switch which when gated to an ON state remains in that state after removal of the gating signal until commutating or other action opens it to an OFF state.

A gating control circuit 33 controls the conductivity state of the silicon controlled rectifiers 22 and 32. It includes a transformer 35 preferably having a saturable substantially square loop magnetic core member 36 which generally is characterized with two opposite flux saturation states between which it can be switched by applied magnetic intensity control. A first gate control winding 38 is coupled to the core member 36 and connected between the gate 28 and the cathode 26 of the switch 22. Similarly, a second gate control winding 40 is coupled to the core member 36 and connected between the gate 29 and the cathode 27 of the switch 32.

The gate control windings 38 and 40 can be oppositely wound upon the core 36 but in this instance are like wound and oppositely connected in the respective rectifier gating circuits in order to apply opposite polarity voltages across the respective sets of gate and cathode terminals. Therefore, core flux switching in one direction induces a properly polarized gating voltage in the control winding 38 to initiate conduction in the switch 22 while core flux switching in the opposite core direction induces a properly polarized gating voltage in the control winding 40 to initiate conduction in the switch 32.

An AC or in this case a pulse input winding 42 is coupled to the core 36 to establish cyclical core operation. Pulses are applied to the input winding 42 by a suitable pulse generator 48 and are preferably provided with just sufficient amplitude to apply to the core 36 the ampere turns required to switch the core 36 from its characteristic near saturation retentivity point of one polarity at zero magnetic intensity to the other saturation state and thereby induce a positive gating voltage in one of the control windings 38 and 40 to latch either the switch 22 or the switch 32 exclusively in a conductive state. In this instance, input pulses tend to induce voltage in the gate control winding 38 for turnon of the switch 22. A core cycle is generated by the winding 42 in the sense that it applies a cyclical magnetic intensity (H) waveform although the core flux (B) need not undergo any substantial change in any one core cycle.

Comparison signal input windings 44 and 46 are also coupled to the core 36 and the net input magnetic intensity or ampere turns applied to the core 36 in any one core cycle accordingly depends upon the relative magnitudes of respective input comparison signals applied to the windings 44 and 46 and the magnitude of the pulse input to the winding 42. Thus, in each core cycle the magnitude and polarity of any voltage developed across the gate control windings 38 and 40 depend upon the extent to which the net ampere turns produced by the comparison input windings 44 and 46 aid or oppose the ampere turns produced by the pulse input winding 42.

More particularly, it can be assumed that the switch 22 is initially latched in the ON state and the commutating capacitor 34 accordingly is charged with the polarity shown. With the application of digital or in this case analog signals A and B to the windings 44 and 46 for comparison, the switch 22 remains in the latched conductive state throughout each core cycle if the net comparison ampere turns aid the ampere turns produced by the pulse input winding 42 or at least do not oppose the pulse input ampere turns to the extent that flux reversal occurs from the existing core saturation state to the other.

As a foundation for comparison, the signals A and B are applied to the windings 44 and 46 so as to produce opposing ampere turns in the core 36. If the signal A produces ampere turns which aid the pulse input ampere turns and which exceed the ampere turns produced by the signal B, the switch 22 remains conductive as just described. However, when a core cycle occurs in which the signal B is increased to exceed the signal A sufficiently to cause flux reversal in the core 36, a positive gating signal is induced in the gate control winding 40 and the switch 32 is made conductive while the switch 22 is commutated by the capacitor 34 to a non-conductive state. Thus, the conducting switch 22 or 32 identifies the larger of the two signals A and B and accordingly provides for an output comparison function for the circuit 8.

The process by which commutation occurs between the switches 22 and 32 is as follows. When the switch 22 is in its conductive state and a signal is developed across the control winding 40 to gate the switch 32, the anode 25 of the switch 32 acquires a potential substantially equal to the potential at the cathode 26 of the switch 22 and the voltage supply terminal 12. Accordingly, the voltage across the commutating capacitor 34 is applied as a back voltage across the switch 22 to cause it to switch from its latched conductive state to its non-conductive state. The commutating capacitor 34 then charges with a polarity opposite to that shown in FIGURE 1 as long as the switch 32 remains latched in its conductive state. When the switch 22 is regated at a later time by voltage developed across the control winding 38, the switch 22 is made conductive and the switch 32 is driven to its non-conductive state by back voltage applied from the commutating capacitor 34. In the normal operation of the circuit 8, it is thus clear that only one of the switches 22 or 32 is in a conductive state at any one time.

The core 36 with preferred square loop saturable character produces excellent circuit switch-over operation. If the pulse input ampere turns and the A signal ampere turns are considered positive, one possible case is that in which the core 36 is in its positive saturation state as a result of the net comparison signal ampere turns alone, i.e., A is greater than B. In that event, the pulse ampere turns have no effect on circuit operation and the switch 22 is continuously conductive from cycle to cycle of core operation.

Another possibility is that the comparison signal ampere turns are equal or just about equal and opposite with the core 36 about at the negative retentivity flux level before the application of pulse ampere turns. When the leading edge of an input pulse is generated, the pulse ampere turns drive the core 36 into positive saturation since the pulse amplitude is preselected to produce just sufficient or slightly more ampere turns to drive the core from negative saturation at about zero magnetic intensity to positive saturation. Squareness of the BH loop aids in effecting sharp core flux switching and, correspondingly, sharp gating voltage induction.

As the core 36 is switched to a positive saturation state, voltage is induced in the control winding 38 to gate the switch 22. On the trailing pulse edge, core flux declines only slightly toward the positive retentivity value at zero magnetic intensity (dependent on the squareness of the BH core loop) and accordingly no appreciable gating voltage is induced in the gate control winding 40 as a result of decreasing core flux. The switch 32 thus remains non-conductive. On subsequent input pulses with no changes in the comparison signals A and B, the switch 22 continues to conduct as the core 36 follows one or more minor hysteresis loops between the pulse zero "retentivity" flux point and full positive saturation.

A further possibility is that the net comparison signal ampere turns are negative, i.e., A is less than B, and the pulse ampere turns are just adequate to drive the core 36 toward zero or slightly positive magnetic intensity but inadequate to switch the core 36 from negative saturation to positive saturation. In that event, the switch 32 will have been conductive and will remain so with continued input pulse generation. Conduction in the switch 32 would have been initiated by the first switching from positive to negative saturation as by an adequate increase in the magnitude of the B signal.

Between the zero magnetic intensity point at which the core 36 is in positive saturation and the small negative magnetic intensity point at which switching occurs to negative saturation, there is a so-called dead-band within which the signal B is greater than the signal A without a corresponding commutation from the switch 32 to the switch 22. Some comparison error thus exists but it is readily made negligibly small by suitable selection of magnetic and electric circuit parameters. Some error effect may also be produced by unwanted transformer action between the input windings or between the gate control windings but in general such error can also be made negligible.

The core 36 also may be in a negative saturation state to the extent that the pulse ampere turns are inadequate to drive the core 36 to the negative flux and negative magnetic intensity boundary portion of the square BH loop. The switch 32 is thus continuously conductive with this core condition.

In general, therefore, conduction through the switch 22 indicates that the signal A is greater than the signal B and conduction through the switch 32 indicates that the signal B is greater than the signal A. Comparison results can be readily detected by sensing the voltage across the resistor 20 or 30.

Other logic comparisons can also be made by the circuit 8. For example, the signals A and B may produce additive flux opposition to the pulse flux in the core 36 with the amplitude of the input pulses set to correspond to some desired summation value of A and B. The core 36 accordingly either remains in the negative saturation state or switches to the positive saturation state as a function of the net value of the applied ampere turns.

Figure 2:
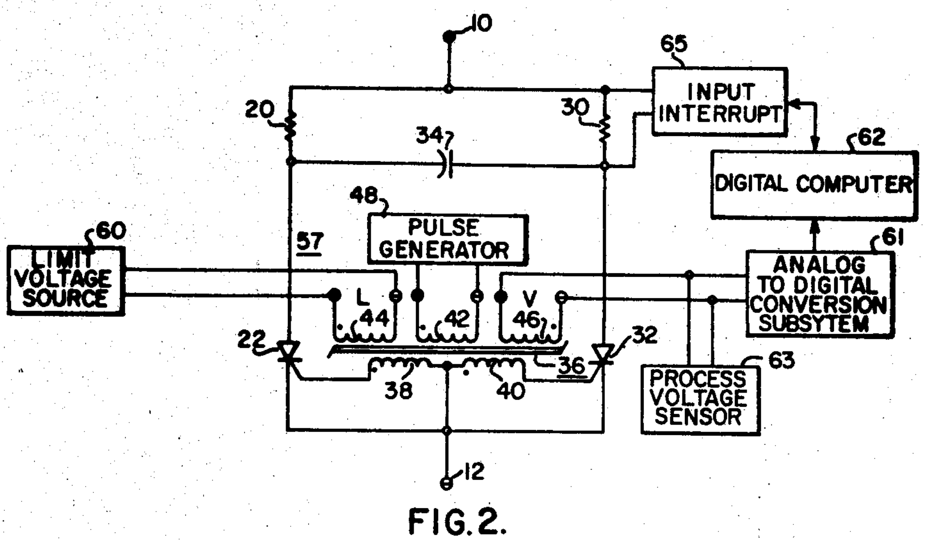
FIG. 2 shows a schematic diagram of a comparison control circuit arranged in accordance with the principles of the invention to provide analog signal value comparison in a digital process control computer inputting system.

A comparison control circuit 57 shown in FIGURE 2 is also arranged in accordance with the principles of the invention and essentially employs the equal and opposite input signal comparison operation of the circuit 8 in an analog to digital input conversion subsystem 61 associated with a digital process computer 62. Like reference characters are employed for like elements in FIGURES 1 and 2.

In many process computer system applications, a large number of analog signals are converted to digital values by relatively slowly operating analog input circuitry for comparison to stored limits in the computer under program control. Most of the time, no action is initiated since the analog values are within limits. Thus, analog input conversion circuit capacity is uneconomically required for inputting information not really needed in the first place.

In order to extend analog inputting capacity without expanding the analog conversion circuitry when timing is critical, the comparison control circuit 57 produces limit comparison externally of the computer 62, and analog inputting to the computer 62 is not required unless and until the measured analog value exceeds the preset limit. An analog limit signal L of predetermined amplitude is applied to the winding 44 from a preselected voltage source 60. The analog signal V to be compared to the limit value L is applied to the analog to digital conversion subsystem 61 and to the winding 46 from the output of a process sensor device or circuit 63. Application of the analog voltage signal V and the limit signal L to the windings 46 and 44 results in opposing ampere turns as indicated by dots in FIGURE 2. A separate comparison control circuit 57 would be employed for each analog signal to be compared with its corresponding limit value.

As in the case of FIGURE 1, pulses of suitable amplitude are applied to the pulse input winding 42 by the pulse generator 48 to apply ampere turns of the same polarity (positive in this case) as those of the analog limit signal L. The pulse repetition rate is preferably set to provide fast hysteresis loop excursion. When the analog limit signal L is greater than or equal to the analog voltage signal V, input pulsing causes a gating voltage in the control winding 38 to make the switch 22 conductive. If the analog voltage V increases to exceed the limit signal L, a voltage is induced in the control winding 40 to make the switch 32 conductive.

The voltage drop across the resistor 30 is used as the comparison control circuit output. Thus, a computer input interrupt 65 is coupled to the resistor 30 and signals the computer 62 when the switch 32 is conductive, i.e. when the analog voltage V exceeds the preset limit value L, and the computer then accepts the analog voltage V as an input in converted form from the analog to digital conversion subsystem 61 thereby enabling the computer 62 to react directly to the over-valued sensor voltage V.

Figure 3:
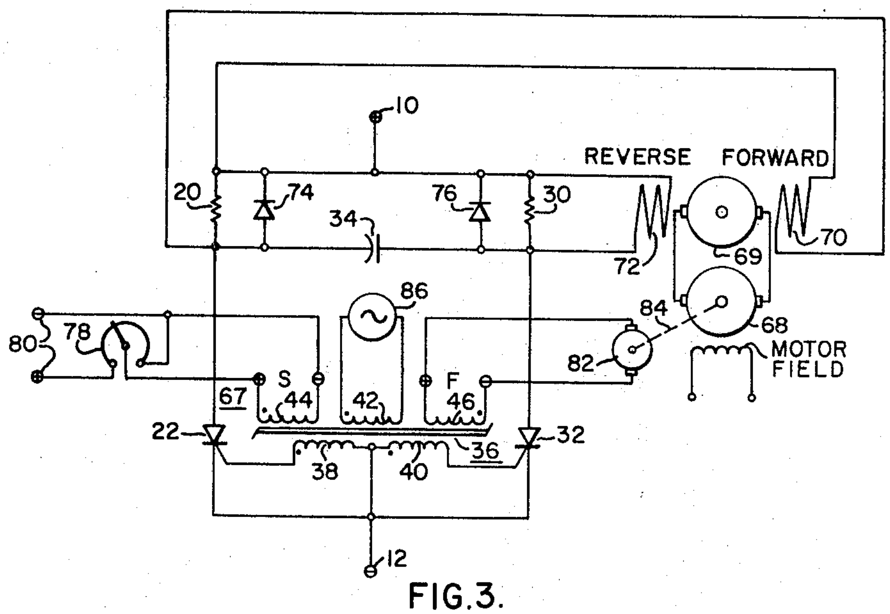
FIG. 3 shows a schematic diagram of a comparison control circuit arranged in accordance with the principles of the invention to provide motor speed control.

In FIGURE 3, there is shown another embodiment of the invention in which a comparison control circuit 67 is employed in a speed control system for a direct current motor 68 having its armature supplied by a generator 69 provided with forward and reverse field windings 70 and 72. The motor field is suitably energized (not indicated). Elements corresponding to those shown in FIGURE 1 are again identified by like reference characters.

The comparison circuit switches 22 and 32 are respectively connected in series with the generator field windings 70 and 72, and the resistors 20 and 30 are in this case connected in parallel with the respective field windings 70 and 72 in order to avoid inductive delay in the turn-on time of the switches 22 and 32. Diodes 74 and 76 are shunted across the resistors 20 and 30 in order to provide a path for inductive field current after turn-off of the switch 22 or 32.

Comparison is made between an analog speed feedback signal F applied to the winding 46 to generate ampere turns of one polarity and a set point or reference analog signal S applied to the winding 44 to generate ampere turns of the opposite polarity. A suitable DC tachometer 82 coupled to the motor 68 as indicated by the reference character 84 generates the signal F. The reference signal S is suitably generated such as by means of a potentiometer 78 connected across a DC voltage source indicated by the reference character 80. In this case, the input winding 42 is supplied with an alternating sinusoidal voltage as indicated by the reference character 86. The magnitude of the input AC voltage is preferably relatively small, i.e. just equal to or slightly greater than the value required to cause the switches 22 and 32 to conduct alternately each cycle when the net ampere turns applied to the core 36 by comparison windings 44 and 46 are substantially zero.

In operation, motor speed is controlled by the motor armature voltage applied from the armature of the generator 69. In turn, the average generator armature voltage depends upon the average reverse and average forward current flow though the generator field windings 70 and 72 over a selected averaging time period. When the average forward and reverse field currents are equal, the average developed motor armature voltage is substantially zero and the motor 69 is at the set point speed. When a greater average forward generator field current is generated, the motor 69 is accelerated, whereas a geater average reverse generator field current causes motor deceleration.

After the set point signal S has been provided with a value corresponding to the desired motor speed, the motor 68 is started and the switch 22 remains continuously conductive or is made conductive on alternate half cycles of the input AC signal 86 as the motor 68 is accelerated to the preset speed. Under this condition, current is supplied from the voltage supply through the generator forward field windings 70 and the switch 22 in the control comparison circuit 67.

When the motor 68 approaches the preset speed, the net comparison ampere turns produced in the core 36 by the signals S and F have a value which allows the AC signal ampere turns to switch the core 36 between positive and negative saturation states. The switches 22 and 32 thus begin to undergo a process of commutation with increasing average reverse current flow through the reverse generator field winding 72 on alternate half cycles of conduction through the switch 32. When the motor 68 is at the set point speed, the net comparison ampere turns in the core 36 are substantially zero and the switches 22 and 32 are made conductive at substantially the same phase point in alternate half cycles to produce substantially equal average current flows in the generator forward and reverse field windings 70 and 72.

If the motor speed increases or decreases slightly from the set point speed, the comparison control circuit 67 causes different average currents to flow in the generator field windings 70 and 72 until the speed is returned to the set point value. If the set point speed is changed to a lower or higher value, the motor 68 is regulated to the new speed value in the manner already described. If desired, rate feedback and current limit control circuits (not shown) can be added by utilizing one or more additional windings on the transformer core 36. Further, the comparison control circuit 67 can be combined with the gating circuitry (not shown) of a solid state or thyristor converter (not shown) which may be used in place of the generator 69 regulating armature voltage application to the DC motor 69.

Figure 4:
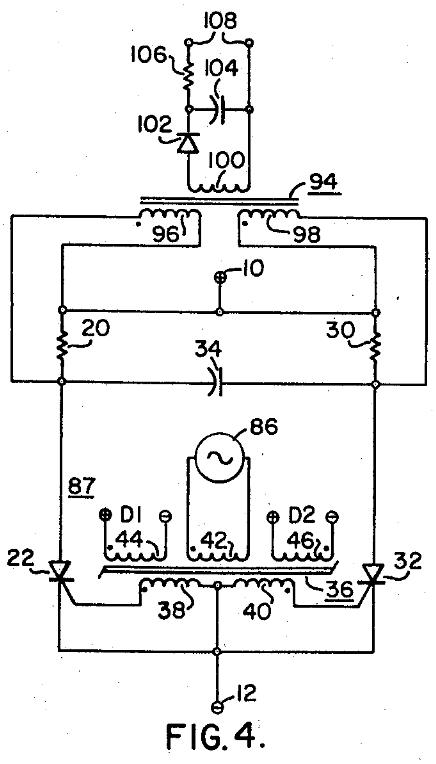
FIG. 4 shows a schematic diagram of a comparison logic circuit arranged in accordance with the principles of the invention to provide digital signal comparison.

In FIGURE 4, there is shown still another embodiment of the invention in which a comparison circuit 87 is operated to compare two digital signals D1 and D2 applied to the transformer windings 44 and 46 in opposition to each other. A sinusoidal alternating current signal again is applied to the input winding 42, and the switches 22 and 32 are commutated if both of the signals D1 and D2 are ONES or ZEROS. If the signals D1 and D2 are different, only the switch 22 or the switch 32 will be made continuously conductive as long as the two signals remain unchanged. For example, with D1 equal to a ONE and D2 equal to a ZERO, the switch 22 is continuously conductive with the switch 32 turned off. If D2 is equal to a ONE and D1 is equal to a ZERO, the switch 32 is continuously conductive with the switch 22 turned off.

To obtain a single output from the circuit 87, a three winding pulse transformer 94 is employed. Respective windings 96 and 98 on the pulse transformer 94 are connected in series with the switches 22 and 32 respectively and in parallel with the respective resistors 20 and 30. A third winding 100 is employed as the output winding and it is connected through a rectifying filtering circuit comprising a diode 102, a capacitor 104 and a resistor 106 to output terminals 108.

When the digital signals D1 and D2 are both ONES or both ZEROS, the switches 22 and 32 are alternately conductive and a voltage is thus induced in the output transformer winding 100 which is rectified to produce a direct current voltage at the output terminals 108. On the other hand, when the input digital signals D1 and D2 are different, only one of the switches 22 and 32 is conductive and no voltage is induced in the winding 100. A zero output voltage at the output terminals 108 thus indicates different digital signals while an elevated output voltage indicates like digital signals. In this sense, the digital comparison circuit 87 functions as a half-adder.

The foregoing description has been presented only to illustrate the principles of the invention. Accordingly, it is desired that the invention not be limited by the embodiments described, but, rather, that it be accorded an intepretation consistent with the scope and spirit of its broad principles.

What is claimed is:

1. A comparison circuit comprising a pair of parallel current paths connectable between a voltage source and a common terminal, a latch type solid state switch and impedance means connected in series in each of said paths, a commutating capacitor connected between said paths, a saturable magnetic core member having respective output windings which develop opposed polarity signals, said output windings respectively coupled to said switches to control the gating thereof, at least one comparison signal winding coupled with said core, and an input winding for coupling a fluctuating signal with said core whereby the conductivity states of said switches at any time is dependent on the net input ampere turns applied to said core member by said input and comparison windings.

2. A comparison circuit as set forth in claim 1 wherein at least two comparison signal windings are coupled with said core for application of opposing ampere turns comparison signals.

3. A comparison circuit as set forth in claim 2 wherein a pulse generator is coupled to said fluctuating input winding and generates pulses adequate in amplitude to switch the saturation state of said core when no comparison signal ampere turns are applied to said core.

4. A comparison control circuit as set forth in claim 2 for use in a system to be provided with comparison control wherein signal generating means is coupled to each of said comparison signal windings, and means responsive to the conductivity state of said switches for developing an output control signal.

5. A comparison circuit as set forth in claim 2 for use in comparing digital signals applied to said comparison signal windings wherein means are coupled to said paths for producing an output signal when said switches are commutating and no output signal when either switch is continuously conductive.

6. A motor speed comparison control circuit as set forth in claim 4 wherein feedback speed signal generating means is coupled to one of said comparison signal windings and a speed set point signal generator is coupled to the other comparison signal winding, and said impedance means in each comparison circuit path including means operable to control the flow of motor armature current.

7. A motor speed comparison control circuit as set forth in claim 6 wherein a generator provides motor armature voltage control and said impedance means in one of said paths includes a reverse generator field winding and said impedance means in the other of said paths includes a forward generator field winding, and an alternating signal generator is coupled to said fluctuating input winding.

8. A motor speed comparison control circuit as set forth in claim 7 wherein said alternating signal generator is provided with a relatively small amplitude output which is adequate to cause commutation of said switches when the set point and feedback ampere turns are substantially equal and opposite.

9. An analog limit comparison control circuit for use in digital process computer systems as set forth in claim 4 wherein an analog signal source is connected to one of said comparison signal windings, and means are provided for generating an analog signal limit for application to the other comparison signal winding so that an output signal can be generated to signal the computer for inputting of the analog signal when it is beyond its limit.

References Cited

UNITED STATES PATENTS

| | | | |
|---|---|---|---|
| 3,209,227 | 9/1965 | Berman et al. | 318—345 XR |
| 3,209,227 | 9/1965 | Berman et al. | 318—345 XR |
| 3,222,586 | 12/1965 | Fontenote et al. | 318—345 XR |
| 3,247,448 | 4/1966 | Siskind | 307—314 XR |
| 3,284,689 | 11/1966 | Rosa | 318—345 |
| 3,291,999 | 12/1966 | Lipman | 307—314 XR |
| 3,302,089 | 1/1967 | Rosa et al. | 318—356 XR |
| 3,331,999 | 7/1967 | Dinger | 318—322 |
| 3,359,478 | 12/1967 | Yates | 318—327 XR |

ORIS L. RADER, Primary Examiner

G. R. SIMMONS, Assistant Examiner

U.S. Cl. X.R.

307—88, 235; 318—257, 327